United States Patent
Cho et al.

(10) Patent No.: US 9,277,408 B2
(45) Date of Patent: Mar. 1, 2016

(54) METHOD AND DEVICE FOR AUTHORIZING USER EQUIPMENT IN A WIRELESS COMMUNICATION SYSTEM

(71) Applicant: LG ELECTRONICS INC., Seoul (KR)

(72) Inventors: Hee Jeong Cho, Anyang-si (KR); Young Soo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 14/350,550

(22) PCT Filed: Oct. 10, 2012

(86) PCT No.: PCT/KR2012/008186
§ 371 (c)(1),
(2) Date: Apr. 8, 2014

(87) PCT Pub. No.: WO2013/055086
PCT Pub. Date: Apr. 18, 2013

(65) Prior Publication Data
US 2014/0310784 A1   Oct. 16, 2014

Related U.S. Application Data (60) Provisional application No. 61/588,094, filed on Jan. 18, 2012, provisional application No. 61/577,090, filed on Dec. 19, 2011, provisional application No. 61/546,563, filed on Oct. 13, 2011, provisional application No. 61/545,200, filed on Oct. 10, 2011.

(51) Int. Cl.
*H04W 12/08* (2009.01)
*H04W 12/12* (2009.01)
*H04W 12/06* (2009.01)
*H04W 12/10* (2009.01)

(52) U.S. Cl.
CPC .............. *H04W 12/08* (2013.01); *H04W 12/12* (2013.01); *H04W 12/06* (2013.01); *H04W 12/10* (2013.01)

(58) Field of Classification Search
CPC ........ H04L 63/10; H04L 63/08; H04L 63/083; H04W 12/08; H04W 12/06
See application file for complete search history.

(56) References Cited

U.S. PATENT DOCUMENTS

2010/0118741 A1* 5/2010 Youn ................. H04W 72/1242
370/259
2010/0172288 A1* 7/2010 Vachhani ................ H04W 4/16
370/328

(Continued)

OTHER PUBLICATIONS

Altaf et al., "Security Enhancements for Privacy and Key Management Protoccol in IEEE 802.16e-2005", 2008, pp. 335-339.*

(Continued)

*Primary Examiner* — Yonas Bayou
(74) *Attorney, Agent, or Firm* — Lee, Hong, Degerman, Kang & Waimey (57) ABSTRACT

The present invention relates to a method and device for authorizing user equipment (UE) in a wireless communication system. The present invention also relates to a method and device for authorizing authorized true user equipment if an abnormal power down report is transmitted from a fake user equipment. The real user equipment checks the abnormal power down from a base station, receives an assignment A-MAP IE, and transmits an authorized message to the base station if power is not abnormally down. Alternatively, user equipment transmits, to the base station, an abnormal power down signaling header that includes authorization parameters, such as COUNTER_TEK or a cipher-based message authentication code (CMAC).

13 Claims, 8 Drawing Sheets

(56) References Cited

U.S. PATENT DOCUMENTS

| | | | | |
|---|---|---|---|---|
| 2011/0026650 | A1* | 2/2011 | Molina | H03L 7/0807 375/344 |
| 2011/0128955 | A1* | 6/2011 | Constantinof | H04M 3/436 370/352 |
| 2011/0317626 | A1* | 12/2011 | Cho | H04L 1/188 370/328 |
| 2012/0064854 | A1* | 3/2012 | Youn | H04W 74/0833 455/404.1 |
| 2012/0226930 | A1* | 9/2012 | Colban | H04W 72/06 713/340 |
| 2013/0070674 | A1* | 3/2013 | Lin | H04W 60/06 370/328 |
| 2013/0077579 | A1* | 3/2013 | Cho | H04W 4/20 370/329 |
| 2013/0315074 | A1* | 11/2013 | Kim | H04W 8/24 370/242 |
| 2014/0057588 | A1* | 2/2014 | Ostrup | H04W 28/26 455/404.1 |

OTHER PUBLICATIONS

Chakrabarti et al., "Enterprise Mobility", Jun. 2006, pp. 1-24.*

Ali Al Shidhani, "Authentication and Key Management in Heterogeneous Wireless Networks", Apr. 2010, pp. 50,206-219.*

Samsung Electronics, ETRI, "Abnormal Power Down Indication", IEEE C802 16p-11/027, Sep. 16, 2011, 4 pages.*

Altaf et al. "Security Enhancements for Privacy and Key Management Protocol in IEEE 802.I6e-2005" Ninth ACII International Conference for Software Engineering, Artificial Intelligence, Networking, and Parallel/Distributed Computing, Aug. 6, 2008, 5 pages.

Chakrabarti et al. "Enterprise Mobility" International Journal of Mobile Communications, Jun. 2006, 24 pages.

Ali Al Shidhani, "Authentication and Key Management in Heterogeneous Wireless Networks" The University of British Columbia, Apr. 2010.

* cited by examiner

METHOD AND DEVICE FOR AUTHORIZING USER EQUIPMENT IN A WIRELESS COMMUNICATION SYSTEM

CROSS-REFERENCE TO RELATED APPLICATIONS

This application is the National Stage filing under 35 U.S.C. 371 of International Application No. PCT/KR2012/008186, filed on Oct. 10, 2012, which claims the benefit of U.S. Provisional Application Ser. Nos. 61/588,094, filed on Jan. 18, 2012, 61/577,090. Filed on Dec. 19, 2011, 61/546,563, filed on Oct. 13, 2011and 61/545,200, filed on Oct. 10, 2011, the contents of which are all hereby incorporated by reference herein in their entirety.

BACKGROUND OF THE INVENTION

1. Field of the Invention

The present invention relates to wireless communications, and more particularly, to a method and apparatus for authorizing a user equipment in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

There is ongoing development on the IEEE 802.16p standard optimized for machine-to-machine (M2M) communication based on the IEEE 802.16e standard and the IEEE 802.16m standard. The M2M communication can be defined as an information exchange performed between a subscriber station and a server or between subscriber stations in a core network without any human interaction. In the IEEE 802.16p standard, there is an ongoing discussion on enhancement of medium access control (MAC) of the IEEE 802.16 standard and a minimum change of an orthogonal frequency division multiple access (OFDMA) physical layer (PHY) in licensed bands. Due to the discussion on the IEEE 802.16p standard, a wide area wireless coverage is required in the licensed band, and a scope of applying automated M2M communication can be increased for an observation and control purpose.

When accessing a network, requirements demanded by many M2M applications are significantly different from requirements for human-initiated or human-controlled network access. The M2M application can include vehicular telematics, healthcare monitoring of bio-sensors, remote maintenance and control, smart metering, an automated service of a consumer device, etc. The requirements of the M2M application can include very lower power consumption, larger numbers of devices, short burst transmission, device tampering detection and reporting, improved device authentication, etc.

A user equipment or an M2M device may be abnormally powered down. When the user equipment or M2M device is abnormally powered down, an abnormal power down signaling header may be transmitted to a base station to notify that power is abnormally down. However, since the abnormal power down signaling header is not subjected to security protection, a fake user equipment or M2M device of which power is not abnormally down may transmit the abnormal power down signaling header. In this case, a service of the authorized original user equipment or M2M device may be interrupted by the abnormal power down signaling header transmitted from the fake user equipment or M2M device.

Accordingly, an efficient method for authorizing the user equipment is required.

SUMMARY OF THE INVENTION

The present invention provides a method and apparatus for authorizing a user equipment in a wireless communication system. The present invention provides an operation for an authorized original user equipment when a fake user equipment transmits an abnormal power down signaling header.

In an aspect, a method for authorizing a first user equipment (UE) in a wireless communication system is provided. The method includes receiving an abnormal power down confirmation from a base station that receives an abnormal power down report from a second UE, receiving an assignment A-MAP IE masked with a station identifier (STID) of the first UE from the base station, wherein the assignment A-MAP IE indicates a resource corresponding to the abnormal power down confirmation, and transmitting an authorized message to the base station when power of the first UE is not abnormally down.

In another aspect, a method for authorizing a first user equipment (UE) in a wireless communication system is provided. The method includes receiving an abnormal power down report from a second UE, transmitting an abnormal power down confirmation as a response to the abnormal power down report, transmitting an assignment A-MAP IE masked with a station identifier (STID) of the first UE, wherein assignment A-MAP IE indicates a resource corresponding to the abnormal power down confirmation, receiving an authorized message, which indicates that power of the first UE is not abnormally down, from the first UE, and cancelling an operation by the abnormal power down report.

In another aspect, a method for authorizing a user equipment (UE) in a wireless communication system is provided. The method includes receiving an abnormal power down signaling header including an authorized parameter from the UE, and performing an abnormal power down procedure for the UE when the UE is a valid UE based on the authorized parameter.

Service interruption of an authorized original user equipment by an abnormal power down signaling header transmitted by a fake user equipment can be prevented.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
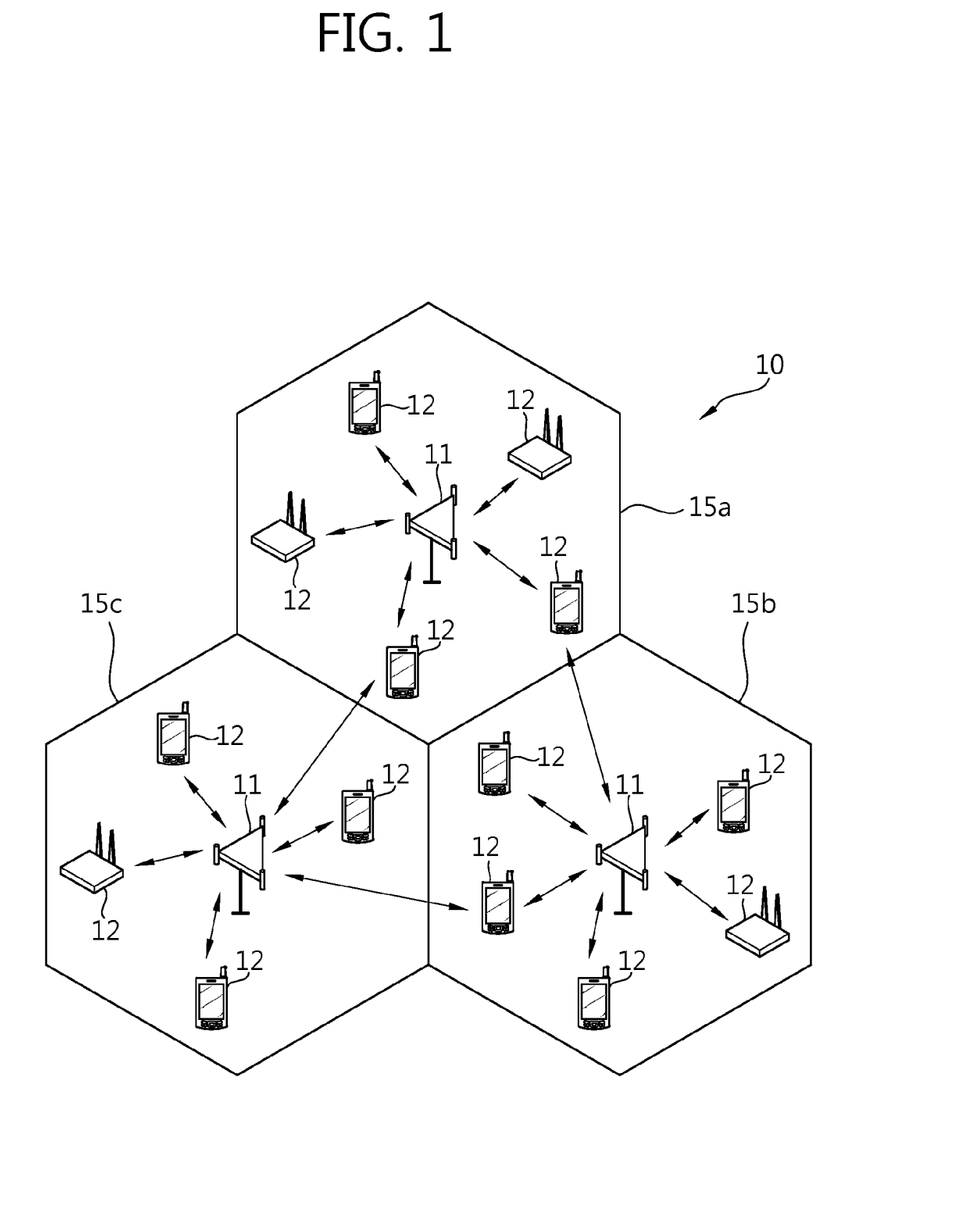
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
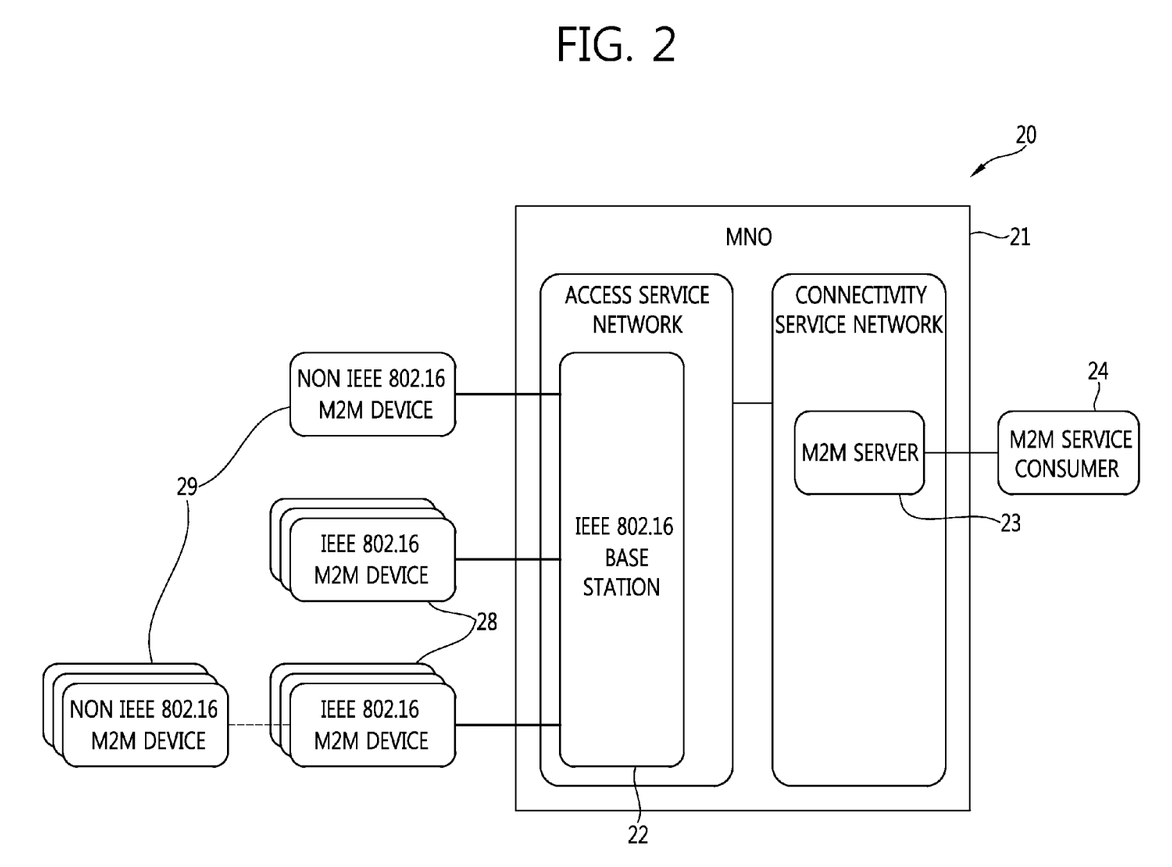
FIG. 2 shows basic M2M service system architecture of IEEE 802.16 supporting machine-to-machine (M2M) communication.

FIG. 2 shows basic M2M service system architecture of IEEE 802.16 supporting machine-to-machine (M2M) communication.

A basic M2M service system architecture 20 includes a mobile network operator (MNO) 21, a M2M service consumer 24, at least one IEEE 802.16 M2M device (hereinafter, 802.16 M2M device) 28, and at least one non-IEEE 802.16 M2M device 29. The MNO 21 includes an access service network (ASN) and a connectivity service network (CSN). The 802.16 M2M device 28 is an IEEE 802.16 mobile station (MS) having a M2M functionality. A M2M server 23 is an entity for communicating with one or more 802.16 M2M devices 28. The M2M server 23 has an interface accessibly by the M2M service consumer 24. The M2M service consumer 24 is a user of a M2M service. The M2M server 23 may be located inside or outside the CSN, and can provide a specific M2M service to the one or more 802.16 M2M devices 28. The ASN may include an IEEE 802.16 base station (BS) 22. A M2M application operates based on the 802.16 M2M device 28 and the M2M server 23.

The basic M2M service system architecture 20 supports two types of M2M communication, i.e., M2M communication between one or more 802.16 M2M devices and a M2M server or point-to-multipoint communication between the 802.16 M2M devices and an IEEE 802.16 BS. The basic M2M service system architecture of FIG. 2 allows the 802.16 M2M device to operate as an aggregation point for a non-IEEE 802.16 M2M device. The non-IEEE 802.16 M2M device uses a radio interface different from IEEE 802.16 such as IEEE 802.11, IEEE 802.15, PLC, or the like. In this case, the non-IEEE 802.16 M2M device is not allowed to change the radio interface to IEEE 802.16.

Figure 3:
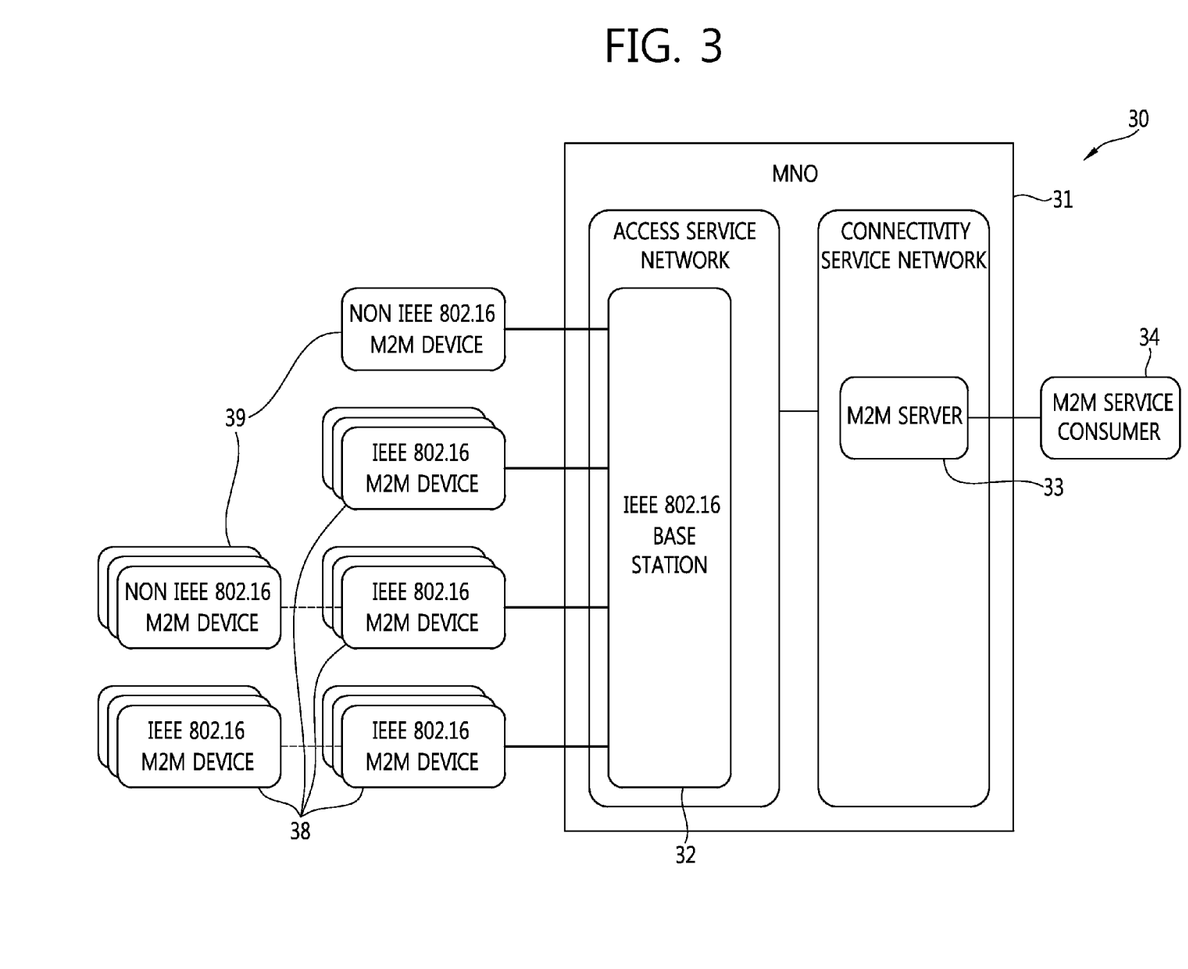
FIG. 3 shows advanced M2M service system architecture of IEEE 802.16 supporting M2M communication.

FIG. 3 shows advanced M2M service system architecture of IEEE 802.16 supporting M2M communication.

In the advanced M2M service system architecture, an 802.16 M2M device can operate as an aggregation point for a non-IEEE 802.16 M2M device, and also can operate as an aggregation point for an 802.16 M2M device. In this case, in order to perform an aggregation function for the 802.16 M2M device and the non-802.16 M2M device, the radio interface can be changed to IEEE 802.16. In addition, the advanced M2M service system architecture can support a peer-to-peer (P2P) connection between 802.16 M2M devices. In this case, the P2P connection can be established on either IEEE 802.16 or another radio interface such as IEEE 802.11, IEEE 802.15, PLC, or the like.

Figure 4:
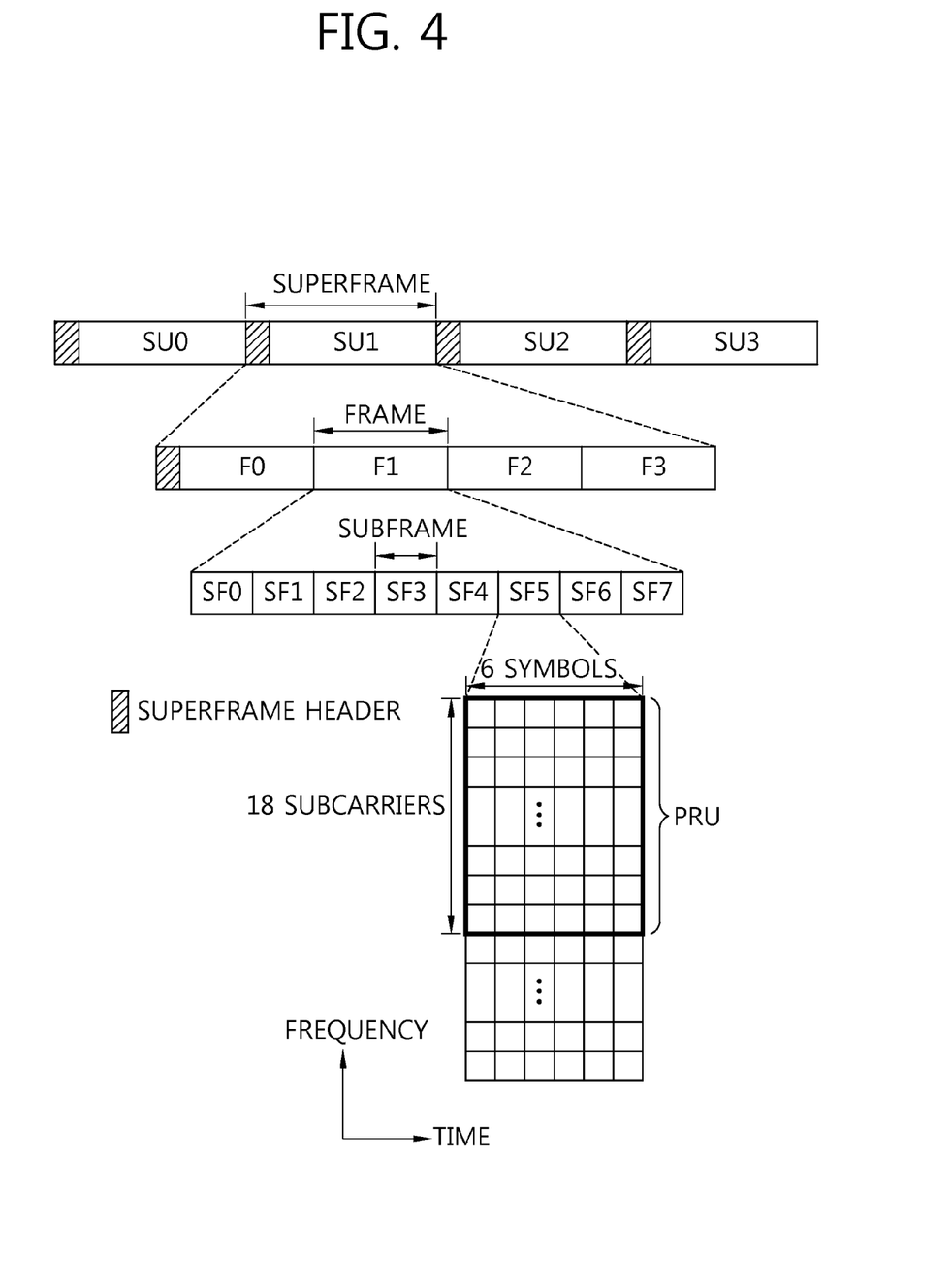
FIG. 4 shows an example of an IEEE 802.16m frame structure.

FIG. 4 shows an example of an IEEE 802.16m frame structure.

Referring to FIG. 4, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like may change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

A superframe header (SFH) can carry an essential system parameter and system configuration information. The SFH may be located in a first subframe in a superframe. The SFH may occupy last 5 OFDMA symbols of the first subframe. The SFH can be classified into a primary-SFH (P-SFH) and a secondary-SFH (S-SFH). The P-SFH may be transmitted in every superframe. Information transmitted on the S-SFH can be divided into 3 sub-packets, i.e., S-SFH SP1, S-SFH SP2, and S-SFH SP3. Each sub-packet can be transmitted periodically with a different periodicity. Information transmitted through the S-SFH SP1, the S-SFH SP2, and the S-SFH SP3 may be different from one another. The S-SFH SP1 may be transmitted with the shortest period, and the S-SFH SP3 may be transmitted with the longest period. The S-SFH SP1 includes information on network re-entry, and a transmission period of the S-SFH SP1 may be 40 ms. The S-SFH SP2 includes information on initial network entry and network discovery, and a transmission period of the S-SFH SP2 may be 80 ms. The S-SFH SP3 includes other important system information, and a transmission period of the S-SFH SP3 may be either 160 ms or 320 ms.

One OFDMA symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDMA symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter. The OFDMA parameter of Table 1 can equally apply to the 802.16e frame structure of FIG. 4.

TABLE 1

| | | Channel bandwidth, BW (MHz) | 5 | 7 | 8.75 | 10 | 20 |
|---|---|---|---|---|---|---|---|
| | | Sampling factor, n | 28/25 | 8/7 | 8/7 | 28/25 | 28/25 |
| | | Sampling frequency, $F_s$ (MHz) | 5.6 | 8 | 10 | 11.2 | 22.4 |
| | | FFT size, $N_{FFT}$ | 512 | 1024 | 1024 | 1024 | 2048 |
| | | Subcarrier spacing, $\Delta f$ (kHz) | 10.94 | 7.81 | 9.77 | 10.94 | 10.94 |
| | | Useful symbol time, $T_b$ (μs) | 91.4 | 128 | 102.4 | 91.4 | 91.4 |
| G = 1/8 | | Symbol time, $T_s$ (μs) | 102.857 | 144 | 115.2 | 102.857 | 102.857 |
| | FDD | Number of ODFMA symbols per 5 ms frame | 48 | 34 | 43 | 48 | 48 |
| | | Idle time (μs) | 62.857 | 104 | 46.40 | 62.857 | 62.857 |
| | TDD | Number of ODFMA symbols per 5 ms frame | 47 | 33 | 42 | 47 | 47 |
| | | TTG + RTG (μs) | 165.714 | 248 | 161.6 | 165.714 | 165.714 |
| G = 1/16 | | Symbol time, $T_s$ (μs) | 97.143 | 136 | 108.8 | 97.143 | 97.143 |
| | FDD | Number of ODFMA symbols per 5 ms frame | 51 | 36 | 45 | 51 | 51 |
| | | Idle time (μs) | 45.71 | 104 | 104 | 45.71 | 45.71 |
| | TDD | Number of ODFMA symbols per 5 ms frame | 50 | 35 | 44 | 50 | 50 |
| | | TTG + RTG (μs) | 142.853 | 240 | 212.8 | 142.853 | 142.853 |
| G = 1/4 | | Symbol time, $T_s$ (μs) | 114.286 | 160 | 128 | 114.286 | 114.286 |
| | FDD | Number of ODFMA symbols per 5 ms frame | 43 | 31 | 39 | 43 | 43 |
| | | Idle time (μs) | 85.694 | 40 | 8 | 85.694 | 85.694 |
| | TDD | Number of ODFMA symbols per 5 ms frame | 42 | 30 | 38 | 42 | 42 |
| | | TTG + RTG (μs) | 199.98 | 200 | 136 | 199.98 | 199.98 |

TABLE 1-continued

| | | | | | |
|---|---|---|---|---|---|
| Number of Guard subcarriers | Left | 40 | 80 | 80 | 80 | 160 |
| | Right | 39 | 79 | 79 | 79 | 159 |
| Number of used subcarriers | | 433 | 865 | 865 | 865 | 1729 |
| Number of PRU in type-1 subframe | | 24 | 48 | 48 | 48 | 96 |

In Table 1, $N_{FFT}$ is smallest power of two greater than $N_{used}$. A sampling factor $F_s$ is floor(n·BW/8000)×8000, a subcarrier spacing $\Delta f$ is $F_s/N_{FFT}$, a useful symbol time $T_b$ is $1/\Delta$, a CP time $T_g$ is $G \cdot T_b$, an OFDMA symbol time $T_s$ is $T_b + T_g$, and a sampling time is $T_b/N_{FFT}$.

Figure 5:
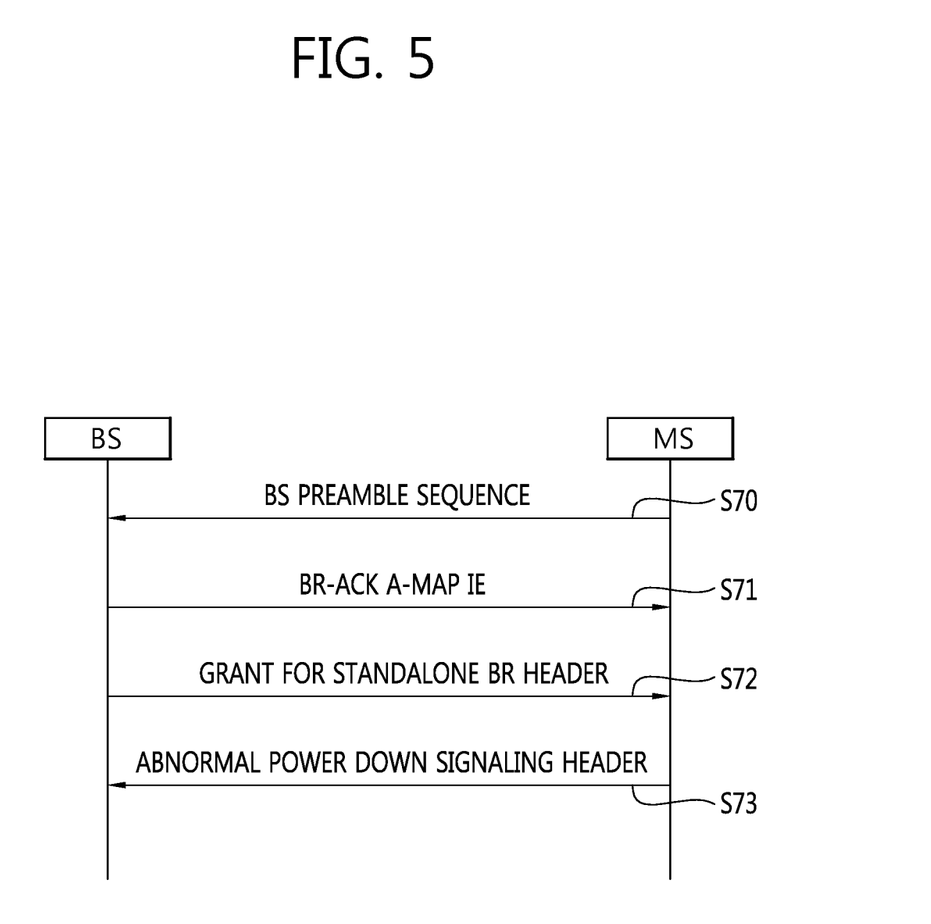
FIG. 5 shows an example of a process of reporting an abnormal power down.

FIG. 5 shows an example of a process of reporting an abnormal power down.

In step S70, the UE transmits a bandwidth request (BR) preamble sequence to the BS.

In step S71, the BS transmits the BR-acknowledgement (ACK) A-MAP information element (IE) to the UE. In step S72, the BS transmits the standalone BR header to the UE.

When the UE detects the abnormal power down, the UE transmits to the BS an abnormal power down signaling header that indicates that the power is abnormally or unintentionally down in step S73. Table 2 shows an example of the abnormal power down signaling header when the UE which is abnormally powered down is the M2M device.

TABLE 2

| Field | Size (bits) | Notes |
|---|---|---|
| Emergency report ( ) { | | |
| FID | 4 | Flow Identifier. Set to 0b0010 |
| Type | 5 | MAC Signaling header type = 0b01000 |
| Length | 3 | Indicates the length of the signaling header in bytes |
| STID | 12 | STID of the M2M device that transmits power down report signaling header |
| STID_Valid_Offset | 3 | STID_Valid_Offset of the M2M device that sends power down report. If the assigned STID is not shared with other M2M devices, M2M device shall set this field to zero. |
| Emergency Type | 3 | 0b000: Power Outage 0b001~0b111: Reserved |
| Reserved | 18 | Reserved. This field shall be set to Zero. |
| } | | |

Referring to Table 2, the abnormal power down signaling header includes a STID-_Valid_Offset field and an Emergency Type field. A value of the Emergency Type field is set to 0 to indicate that the power is abnormally or unintentionally down.

Hereinafter, according to embodiments of the present invention, a method for preventing service interruption of an authorized original UE because a fake UE transmits an abnormal power down signaling header is described.

Figure 6:
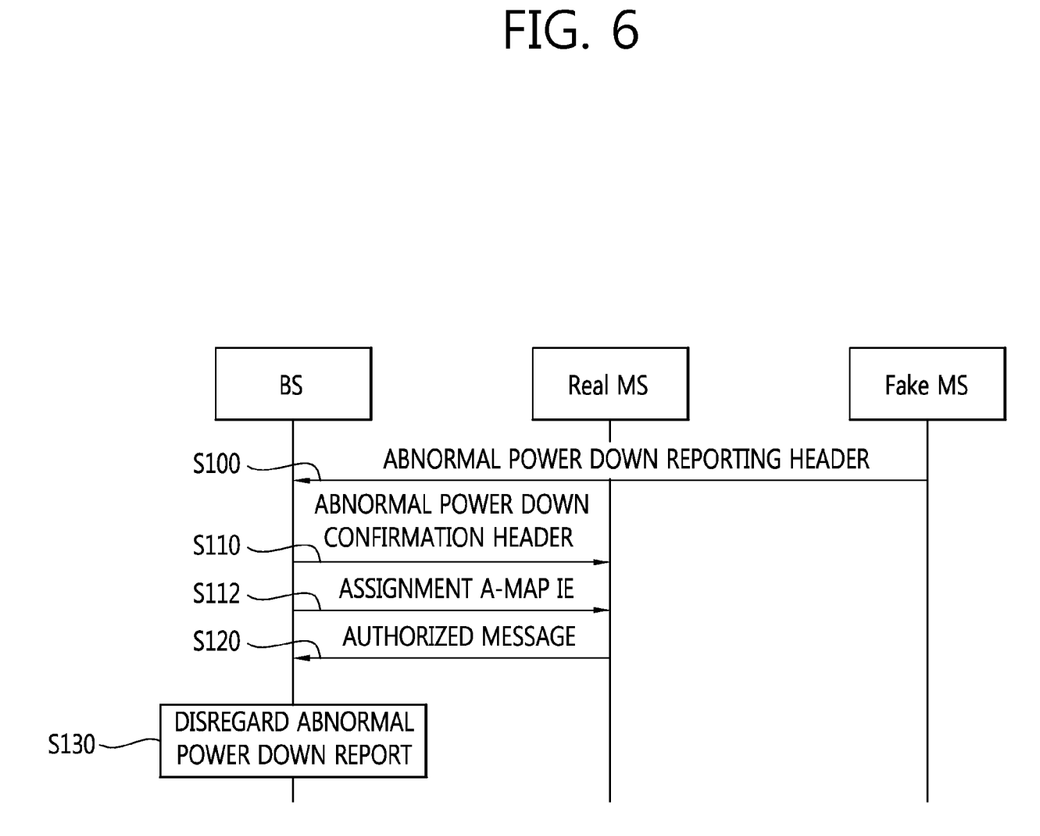
FIG. 6 shows an example of a method for authorizing a UE according to an embodiment of the present invention.

FIG. 6 shows an example of a method for authorizing a UE according to an embodiment of the present invention.

In step S100, a fake UE transmits an abnormal power down reporting header to a BS. Alternatively, the fake UE may transmit to the BS a ranging request message (AAI-RNG-REQ) notifying that the abnormal power down occurs.

In step S110, the BS transmits an abnormal power down confirmation header as a response to the abnormal power down reporting header. Alternatively, when the BS receives the ranging request message from the fake UE, the BS may transmit a ranging response message (AAI-RNG-RSP) as a response to the ranging request message. Alternatively, in step S120, the BS transmits to a true UE an assignment A-MAP IE masked with a station ID (STID) of the corresponding UE in order to notify through which resource the abnormal power down reporting header or the AAI-RNG-RSP message is transmitted.

The BS should not delete information on the corresponding UE immediately in spite of receiving the abnormal power down reporting header. That is, the BS needs to retain the information on the information on the corresponding UE for a predetermined time. The predetermined time may be defined in a form of a global value or defined based on a timer. For example, the predetermined time may be a receiving stand-by time of an authorized message received from the UE. The same resource as the STID assigned to the corresponding UE should not be assigned to another UE for the predetermined time.

In step S130, the true UE transmits the authorized message to the BS. The true UE which is an owner of the corresponding STID as well as the fake UE may also receive the abnormal power down confirmation header or the AAI-RNG-RSP message transmitted by the BS, and confirm even the assignment A-MAP IE corresponding thereto. When the true UE receives the abnormal power down confirmation header or the AAI-RNG-RSP message in spite of not transmitting the abnormal power down reporting header or the AAI-RNG-REQ message, the true UE which is the owner of the corresponding STID may transmit the authorized message such as a cipher-based message authentication code (CMAC), a full authorization key (AK) count, etc. Accordingly, the true UE may notify to the BS that the abnormal power down reporting header transmitted by the fake UE is invalid.

In step S140, the BS cancels an operation by the abnormal power down report received from the fake UE. That is, the BS may disregard the abnormal power down report of the fake UE and cancel service interruption of the authorized true UE. As a result, the service of the true UE may be prevented from being interrupted.

Figure 7:
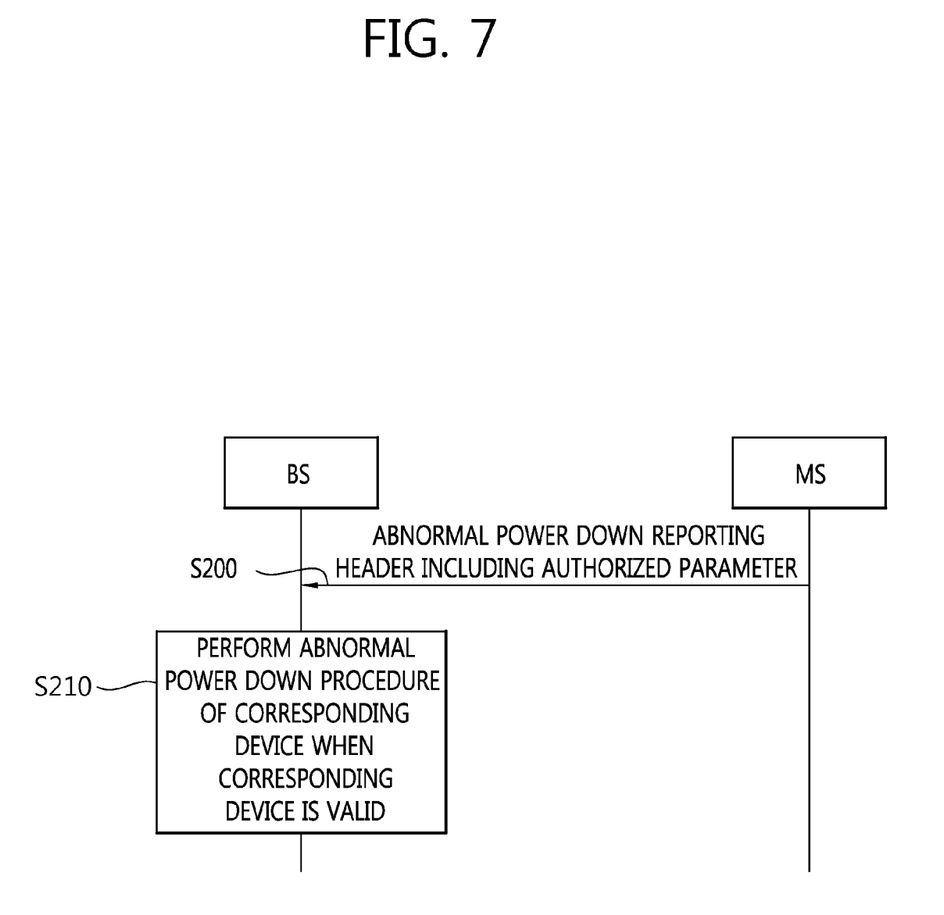
FIG. 7 shows an example of a method for authorizing a UE according to an embodiment of the present invention.

FIG. 7 shows an example of a method for authorizing a UE according to an embodiment of the present invention.

In step S200, the UE transmits the abnormal power down reporting header including an authorized parameter. The authorized parameter may be any one of COUNTER_TEK or CMAC.

1) The authorized parameter may be COUNTER_TEK. COUNTER_TEK is a counter used to derive different transport encryption keys (TEKs) from the same security association ID (SAID). A value of the counter may be changed whenever a new TEK needs to be derived within a time when a pair of AK and AK_COUNT are valid. The SAID represents a security association (SA) to which the TEK belongs. Each SA may retain two TEKs every given time. Two TEKs may be derived from two consecutive counter values. The counter value may be reset whenever a new CMAC-TEK prekey is derived.

The TEK may be derived by the UE and the BS by applying an identifier parameter to a key derivation function. All PKMv3 keys are derived based on a Dot16KDF algorithm. The TEK may be derived by Equation 1.

$$TEK_i=\text{Dot16KDF (CMAC-TEK prekey, SAID|COUNTER\_TEK}=i+\text{"TEK", 128)} \quad \text{<Equation 1>}$$

2) The authorized parameter may be CMAC. The M2M device may support integrity protection of the abnormal power down signaling header based on the CMAC together with an advanced encryption standard (AES) block cipher. A CMAC construction represented in NIST Special Publication 800-38B may be used.

A CMAC algorithm may be used together with an AES in calculating a keyed hash value included in a CMAC digest attribute and a CMAC tuple. A UL authorized key CMAC_SIG_KEY_U may be used to authorize the abnormal power down signaling header transmitted from the M2M device in a UL direction. CMAC_SIG-KEY_U may be derived by Equation 2.

$$\text{CMAC\_SIG\_KEY\_U}=\text{Dot16KDF (CMAC-TEK prekey,"CMACSIG", 128)} \quad \text{<Equation 2>}$$

A rollover counter (ROC) is a counter for a frame number when the frame number reaches from 0x000000 to 0xFFFFFF and may increase by 1 mod $2^8$. The ROC may have 8 bits. The ROC may be reset to 0 when the new CMAC-TEK prekey is acquired. By using this method, one abnormal power down signaling header per frame using the same CMAC_SIG_KEY_U may be supported. CMAC_SIG_KEY_U which is a new ciphered key may be requested every $2^{32}$ frames. A reauthorization process may be initialized in order to set new privacy key management (PMK)/AK before the ROC reaches the maximum value.

The CMAC value may be calculated on a field including an AK ID, a super frame number and a frame index which are represented by 24 bits without a code, a 12-bit STID and a 4-bit FID (an FID of the signaling header), the ROC, 0 padding of 16 bits (for an AES block size and an aligned header), the CMAC, and contents of remaining abnormal power down signaling headers other than the ROC. The field may be configured in the order of the AK ID, the superframe number and the frame index, the STID and the FID, the 0 padding, and the contents of the abnormal power down signaling header. The CMAC value may be calculated by Equation 3.

$$\text{CMAC}=\text{Truncate (CMAC (CMAC\_SIG\_KEY\_U, AK ID 1(superframe number of 22 bits)|(frame index of 2 bits)|STID|FID|ROC|(0 padding of 16 bits)| (contents of abnormal power down signaling header other than CMAC)), 16)} \quad \text{<Equation 3>}$$

Referring to Equation 3, least significant bit (LSB) 16 bit in calculating the AES-CMAC may be used as the CMAC value. Further, in Equation 3, (superframe number of 22 bits)1 (frame index of 2 bits) may be a value when a BR preamble code is transmitted.

Alternatively, the CMAC value may be calculated by Equation 4.

$$\text{CMAC}=\text{Truncate(CMAC(CMAC\_SIG\_KEY\_U, AK ID|(RAID of 12 bits)|(RAID of 12 bits) |STID|FID|ROC|(0 padding of 16 bits)|(contents of abnormal power down signaling header other than CMAC and ROC), 16)} \quad \text{<Equation 4>}$$

In Equation 4, a random access ID (RAID) may be constituted by a time when the BR preamble code is transmitted and an index of the transmitted BR preamble code.

Referring back to FIG. 7, the BS determines whether the UE is a valid UE by receiving from the UE the abnormal power down reporting header including the authorized parameter. When the UE that transmits the abnormal power down reporting header is the valid UE, the BS performs an abnormal power down procedure of the corresponding UE in step S210.

Figure 8:
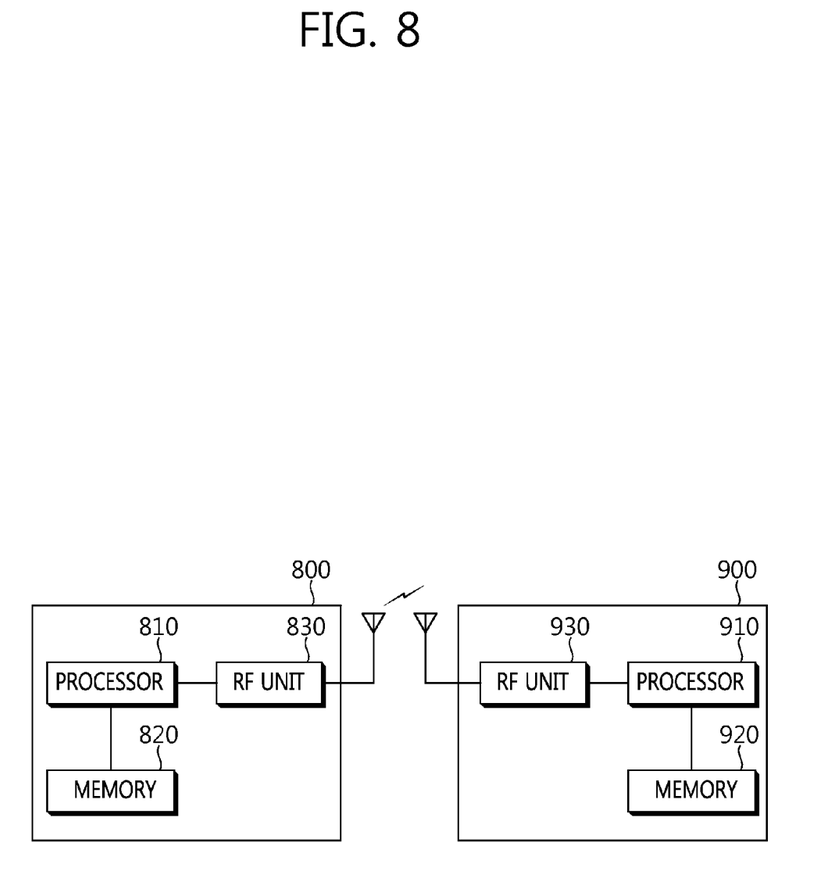
FIG. 8 is a block diagram showing wireless communication system to implement an embodiment of the present invention.

FIG. 8 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An M2M device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for authorizing a first user equipment (UE) in a wireless communication system, the method comprising:
   receiving, by the first UE, an abnormal power down confirmation as a response to an abnormal power down report from a base station which receives the abnormal power down report from a second UE;
   receiving, by the first UE, an assignment A-MAP Information Element (IE) masked with a station identifier (STID) of the first UE from the base station, wherein the assignment A-MAP IE indicates a resource corresponding to the abnormal power down confirmation; and transmitting, by the first UE, an authorized message to the base station when power of the first UE is not abnormally down.

2. The method of claim 1, wherein the abnormal power down confirmation is received via an abnormal power down confirmation header or a ranging response message (AAI-RNG-RSP).

3. The method of claim 1, wherein the authorized message includes a cipher-based message authentication code (CMAC) or a full authorized key (AK) count.

4. A method for authorizing a first user equipment (UE) in a wireless communication system, the method comprising:
receiving, by a base station, an abnormal power down report from a second UE;
transmitting, by the base station, an abnormal power down confirmation as a response to the abnormal power down report;
transmitting, by the base station, an assignment A-MAP Information Element (IE) masked with a station identifier (STID) of the first UE,
wherein the assignment A-MAP IE indicates a resource corresponding to the abnormal power down confirmation;
receiving, by the base station from the first UE, an authorized message, which indicates that power of the first UE is not abnormally down; and
cancelling an operation based on the abnormal power down report.

5. The method of claim 4, wherein the abnormal power down report is received via an abnormal power down signaling header or a ranging request message (AAI-RNG-REQ).

6. The method of claim 4, wherein the abnormal power down confirmation is transmitted via an abnormal power down confirmation header or a ranging response message (AAI-RNG-RSP).

7. The method of claim 4, further comprising:
retaining information on the first UE for a predetermined time upon receiving the abnormal power down report.

8. The method of claim 7, wherein the predetermined time is defined in a form of a global value or defined based on a timer.

9. The method of claim 4, wherein the authorized message includes a cipher- based message authentication code (CMAC) or a full authorized key (AK) count.

10. A method for authorizing a user equipment (UE) in a wireless communication system, the method comprising:
receiving an abnormal power down signaling header including an authorized parameter from the UE; and
performing an abnormal power down procedure for the UE when the UE is a valid UE based on the authorized parameter~
wherein the authorized parameter includes a cipher-based message authentication code (CMAC).

11. The method of claim 10, wherein the authorized parameter further includes a COUNTER_Transport Encryption Key (TEK).

12. The method of claim 10, wherein the CMAC is calculated based on the equation below:

$$CMAC = \text{Truncate}\,(CMAC\,(CMAC\_SIG\_KEY\_U, AK\,ID\,|(\text{superframe number of 22 bits})|(\text{frame index of 2 bits})|STID|FID|ROC|(0\text{ padding of 16 bits})|(\text{contents of the abnormal power down signaling header other than CMAC})), 16)$$

where CMAC_SIG_KEY_U denotes a value used to authorize the abnormal power down signaling header transmitted from the UE in a UL direction, an authorization key (AK) ID denotes an authorization key identifier, STID denotes a station identifier, FID denotes a flow identifier, and ROC denotes a rollover count.

13. The method of claim 10, wherein the CMAC is calculated based on an equation below $$CMAC = \text{Truncate}(CMAC\,(CMAC\_SIG\_KEY\_U, AK\,ID\,|(RAID\text{ of 12 bits})|(RAID\text{ of 12 bits})|STID|FID|ROC|(0\text{ padding of 16 bits})|(\text{contents of the abnormal power down signaling header other than CMAC and ROC}), 16)$$

where CMAC_SIG_KEY_U denotes a value used to authorize the abnormal power down signaling header transmitted from the UE in a UL direction, AK ID denotes an authorization key identifier, RAID denotes a random access identifier, STID denotes a station identifier, FID denotes a flow identifier, and ROC denotes a rollover count.

* * * * *